US012525739B2

(12) United States Patent
Corona

(10) Patent No.: US 12,525,739 B2
(45) Date of Patent: Jan. 13, 2026

(54) MOISTURE RESISTANT SEAL FOR ELECTRICAL CABLE ASSEMBLIES

(71) Applicant: DSM&T Company Inc., Fontana, CA (US)

(72) Inventor: Sergio Corona, Fontana, CA (US)

(73) Assignee: DSM&T COMPANY INC., Fontana, CA (US)

( * ) Notice: Subject to any disclaimer, the term of this patent is extended or adjusted under 35 U.S.C. 154(b) by 367 days.

(21) Appl. No.: 18/164,306

(22) Filed: Feb. 3, 2023

(65) Prior Publication Data

US 2024/0266779 A1 Aug. 8, 2024

(51) Int. Cl.
*H01R 13/52* (2006.01)
*H01R 13/502* (2006.01)

(52) U.S. Cl.
CPC ..... *H01R 13/5202* (2013.01); *H01R 13/5025* (2013.01); *H01R 13/5219* (2013.01)

(58) Field of Classification Search
None
See application file for complete search history.

(56) References Cited

U.S. PATENT DOCUMENTS

| | | | | |
|---|---|---|---|---|
| 4,832,615 A * | 5/1989 | Thakrar | H01R 13/5219 | 439/272 |
| 6,007,362 A * | 12/1999 | Davis | H01R 13/6456 | 439/680 |
| 7,351,117 B1 * | 4/2008 | Mostoller | H01R 13/506 | 439/744 |
| 9,274,287 B2 * | 3/2016 | Takano | G02B 6/3883 | |
| 10,601,174 B2 * | 3/2020 | Li | H01R 13/633 | |
| 2010/0249723 A1 * | 9/2010 | Fangrow, Jr. | A61M 39/221 | 604/247 |
| 2015/0126075 A1 * | 5/2015 | Chen | H01R 13/642 | 439/678 |

* cited by examiner

*Primary Examiner* — Tho D Ta

(74) *Attorney, Agent, or Firm* — Ruggiero McAllister & McMahon LLC

(57) ABSTRACT

An electrical connector including a linear locking device, which is provided as a weatherproof structure for connecting and disconnecting an electrical cable quickly and easily but comprises a robust structure that will not disconnect easily. The electrical connector is resistant to breakage and is keyed for quick connection without the need to look at the connector to make a secure connection.

27 Claims, 12 Drawing Sheets

MOISTURE RESISTANT SEAL FOR ELECTRICAL CABLE ASSEMBLIES

FIELD OF THE INVENTION

The present invention relates to a locking device for an electrical connector. In particular, the device locks in a linear fashion and includes a pin configuration that allows for lateral force to be applied without breaking the electrical connection or pins. The device is designed to operate in wet and harsh environments without leakage or damage.

BACKGROUND OF THE INVENTION

One challenge faced in the electrical connection industry is ensuring the stable protection of electrical connections between two cables. This is especially true for connections made in harsh environments such as wet or very hot or cold environments. Manufacturers go to great lengths to provide connectors that will withstand harsh environments and ensure a stable and continuous electrical connection.

However, many problems can arise with electrical connectors that can cause a disruption in the operation of an electrical system. One problem is water ingress, which can a short-circuit or interrupt a connection between a first and second transmission line. Another problem is damage to the electrical connector itself, which could lead to a broken electrical connection resulting in an open circuit. Both these problems described above will result in the electrical device (e.g., a light, a piece of equipment, etc.) not functioning properly.

To address the above problems, some have increased the gauge of the plastic used to form the electrical connector. The idea behind this approach is to make the connector as rigid as possible to avoid damage to the internal components. While this approach has led to more robust electrical connectors, it has not addressed all the issues faced in certain operating conditions. For example, when an electrical connector is used in a vehicle or in a vessel, often the electrical connector will encounter vibration. This could be due to the operation of an engine, or the movement of the vehicle or vessel. The constant vibration and movement can cause the connection between two connectors to become loose, which in turn, can result in lateral forces being applied to the pins in one side of the connector becoming damaged as they engage with cavities in a second connector.

In applications where the electrical connectors can encounter severe vibration, one approach has been to use a threaded connector on one side that will engage with a threaded collar on a second connector. While these types of connectors can provide a secure connection, they cannot be disengaged quickly when needed. Often these types of connectors are secured so tightly that a wrench or channel locks are needed to untighten the connection. Additionally, because they are often tightened so hard, when the threaded portion and the collar are formed of hard plastic, the collar can break or crack when tightened. This breakage can include hairline fractures that are visibly imperceptible but can allow water to enter the connector and cause problems with the operation of the system.

It would be good to have an electrical connector that addresses the problems discussed above.

SUMMARY OF THE INVENTION

Accordingly, what is desired is an electrical connector that can quickly be connected and disconnected while at the same time provides a secure connection that will not loosen.

It is further desired to provide an electrical connector that provides for quick connection and disconnection without the need of a tool and prevents water ingress.

It is still further desired to provide an electrical connector that allows for lateral play between a male and female connector and prevents breaking of the pins and water-ingress into the connector.

These and other objects are achieved in one embodiment by the provision of an electrical connector that includes a second electrical connector that comprises a plurality of pins and a first electrical connector that comprises a plurality electrically conductive receptacles corresponding to the plurality of pins. The pins may be connected to the second electrical connector at a base portion of each pin, where each pin is seated in a flexible material allowing for some lateral movement of the distal end of the pin without breaking the pins. In one configuration, the flexible material could comprise a molded silicone that provides a seal at the base portion of each respective pin.

In one configuration, the first electrical connector may be provided with an insertion section and the second electrical connector may be provided with a cavity for receiving the insertion section. The cavity may include a plurality of protrusions each having open ends in which the plurality of pins is provided. In this configuration, the flexible material is provided at the bottom of each of the pins, which are seated in the flexible material. The corresponding first connector may be provided with a plurality of cavities that correspond to each of the plurality of protrusions in the cavity. In this configuration, the insertion section of the first connector is inserted into the cavity of the second connection. When this happens, the plurality of protrusions in the cavity of the second connector engage with the plurality of cavities in the distal end of the insertion section. This in turn, causes the plurality of pins in the plurality of cavities to align with and engage with the receptacles forming an electrical connection between each of the pins with each of the receptacles. A first cable comprising a plurality of electrical conductors may enter the first connector via a compression connection where each of the electrical conductors are coupled to the receptacles. Likewise, a second cable comprising a plurality of electrical conductors may enter the second connector via a compression connection where each of the electrical conductors are coupled to the pins. In this way, a secure and robust electrical connection can be made between the first and second cables.

An exterior surface of the insertion section may further be provided with at least one or more channels that extend circumferentially around the exterior surface of the insertion section and in which an O-ring is positioned. In one configuration, the insertion section may comprise three channels as described above where each includes an O-ring. The O-rings may extend beyond the circumference of the insertion section such that when the insertion section is inserted into the cavity of the second connector, the O-ring(s) engage with an inner surface of the cavity of the second connector forming a seal. It is contemplated that when multiple O-rings are used, the O-ring that is positioned closer to the distal end of the insertion section may comprise a smaller diameter than the O-ring(s) that are position closer to the proximal end of the insertion section. Additionally, it is contemplated that the insertion section may comprise a tapered for frustoconical section where the distal end of the insertion section may be slightly smaller in circumference than the proximal end of the insertion section.

In still another configuration, the first connector may be provided with a locking mechanism positioned on an exterior surface of the connector body. This locking mechanism may comprise an arm that is connected to the exterior surface of the first connector. The arm may comprise a plastic material and allows the arm to flex or bend. The second connector may be provided with a corresponding locking mechanism that may comprise a recess formed as an undercut that is designed to engage with the arm when the first and second connectors are fully engaged and seated with respect to each other. For example, the arm may be provided with a protrusion at a distal end of the arm. Then the first and second connectors are engaged with each other and are being joined together, the protrusion on an underside of the arm engages with an exterior surface of the second connector. When the first connector is advanced fully into the second connector, the protrusion flexes downward to seat with the undercut such that if force were applied to pull the connectors apart, the protrusion engaging with the undercut would prevent the first and second connectors from pulling apart.

In still another configuration, a raised portion on a proximal end of the arm is provided and the arm is connected to the exterior surface of the first connector at a location on the arm between the distal and proximal ends. In this case, a force applied downward to the proximal end will cause the distal end to rise upward (and disengage with the undercut) as the connection of the arm to the exterior surface of the first connector will act as a pivot point for the arm. The raised portion allows for ease in pushing the proximal end of the arm downward.

It is contemplated that the arm may be provided at an angle relative to the exterior surface of the first connector. In one configuration, this angle may be five degrees such that, when the arm is at rest, the distal end of the arm is closer to the exterior surface of the first connector than the proximal end when no pressure is applied to the arm. However, as described above, the arm can pivot about the connection point allowing for connection and disconnection of the locking mechanism. This configuration results in a very secure locking mechanism that can securely hold the first and second connectors together, but at the same time, allows for a very quick disconnection of the first and second connectors when this is needed when time of connection/disconnection is critical. No rotation of any pieces is needed, no tools are needed to connect/disconnect, while at the same time a very secure and watertight connection is provided.

In still another configuration, the exterior surface of the first connector could be provided with a raised section that is provided adjacent to the proximal end of the arm. The raised section may comprise sloped or wedge-shaped area where the highest point of the sloped or wedge-shaped area is provided relatively close to the proximal end of the arm. This would function to limit any inadvertent force from pressing downward on the proximal end of the arm enough to inadvertently disconnect the locking mechanism. To disconnect the locking mechanism, force to cause the proximal end of the arm to deflect downward enough to disengage the distal end of the arm with the undercut would have to be specifically applied only to the proximal end of the arm. Additionally, the tapered construction of the raised section would function to prevent the connector and the proximal end of the arm from becoming inadvertently snagged on or engaged with another surface. In another configuration, the raised section may be provided as a single raised section. Alternatively, the raised section could comprise multiple (e.g., four) raised sections. Still further, when the raised section comprises multiple raised sections, the upper surfaces of the raised sections could be angled to substantially match the cylindrical exterior surface of the first connector.

While the raised section was discussed above in connection with the first connector and the arm, it is contemplated that a corresponding raised surface(s) may also be provided on the second connector adjacent to the undercut.

In still another configuration, it is contemplated that the plurality of protrusions in the second connector may be keyed to match the plurality of cavities in the distal end of the insertion section. For example, the plurality of protrusions may comprise six total protrusions where five of the protrusions are circular in shape in cross section and one of the protrusions is tombstone shaped. The plurality of cavities in the distal end of the insertion section may also have cross-sectional shapes that match the protrusions such that the connection between the first and second connectors can only be achieved in one rotational configuration. While the example of a tombstone shaped protrusion and cavity are used, it is contemplated that any concept that only allows for one rotational connection could be used. Additionally, it is not critical that one or more protrusions and associated cavities be keyed. Rather, it is contemplated that the exterior surface of the insertion section and an interior surface of the cavity of the second connector could be keyed and achieve a similar result.

For this application the following terms and definitions shall apply:

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration, a weatherproof electrical connector is provided comprising a first connector having first and second ends, the first end formed as an insertion section. The insertion section is provided having: an end face having a plurality of cavities, and a plurality of electrically conductive receptacles positioned within said plurality of cavities. The electrical connector further comprises a second connector having first and second ends, the first end formed as a cavity for receiving the insertion section, the cavity having a plurality of protrusions positioned therein and corresponding to the plurality of cavities in the end face of the insertion section. The second connector is provided such that each of the plurality of protrusions is provided with an end face with an opening provided therein, and a pin for engaging with a corresponding electrically conductive receptacle in the plurality of cavities in the end face of the first connector. The electrical connector is provided such that the first connector has a locking member formed as an arm and has a raised section at a distal end of the arm. The electrical connector is further provided such that the second connector has an undercut positioned thereon that is adapted to interact with the raised section of the arm such that when the first and second connectors are fully seated with each other, the raised section interacts with the undercut to prevent the first and second connectors from being pulled apart.

In another configuration, a weatherproof electrical connector is provided comprising a first connector having a first end formed as an insertion section, the insertion section having an end face with a plurality of cavities formed therein, and a second connector having a first end formed as a cavity for receiving the insertion section, the cavity having a plurality of protrusions positioned therein corresponding to the plurality of cavities. The weatherproof electrical connector is provided such that the plurality of protrusions is provided with an end face with an opening provided therein. The weatherproof electrical connector further comprises a pin provided in each of the plurality of cavities or each of the openings, and an electrically conductive receptacle provided in each of the plurality of cavities or each of the openings, wherein the pin and receptacles are designed to interact with each other to form an electrical connection. The weatherproof electrical connector is further provided such that the first connector has a locking member formed as an arm and has a raised section at a distal end of the arm, and the second connector has an undercut positioned thereon that is adapted to interact with the raised section of the arm such that when the first and second connectors are fully seated with each other, the raised section interacts with the undercut to prevent the first and second connectors from being pulled apart.

Other objects of the invention and configurations including features and advantages will become more apparent from consideration of the following drawings and accompanying detailed description.

DETAILED DESCRIPTION OF THE INVENTION

Figure 1:
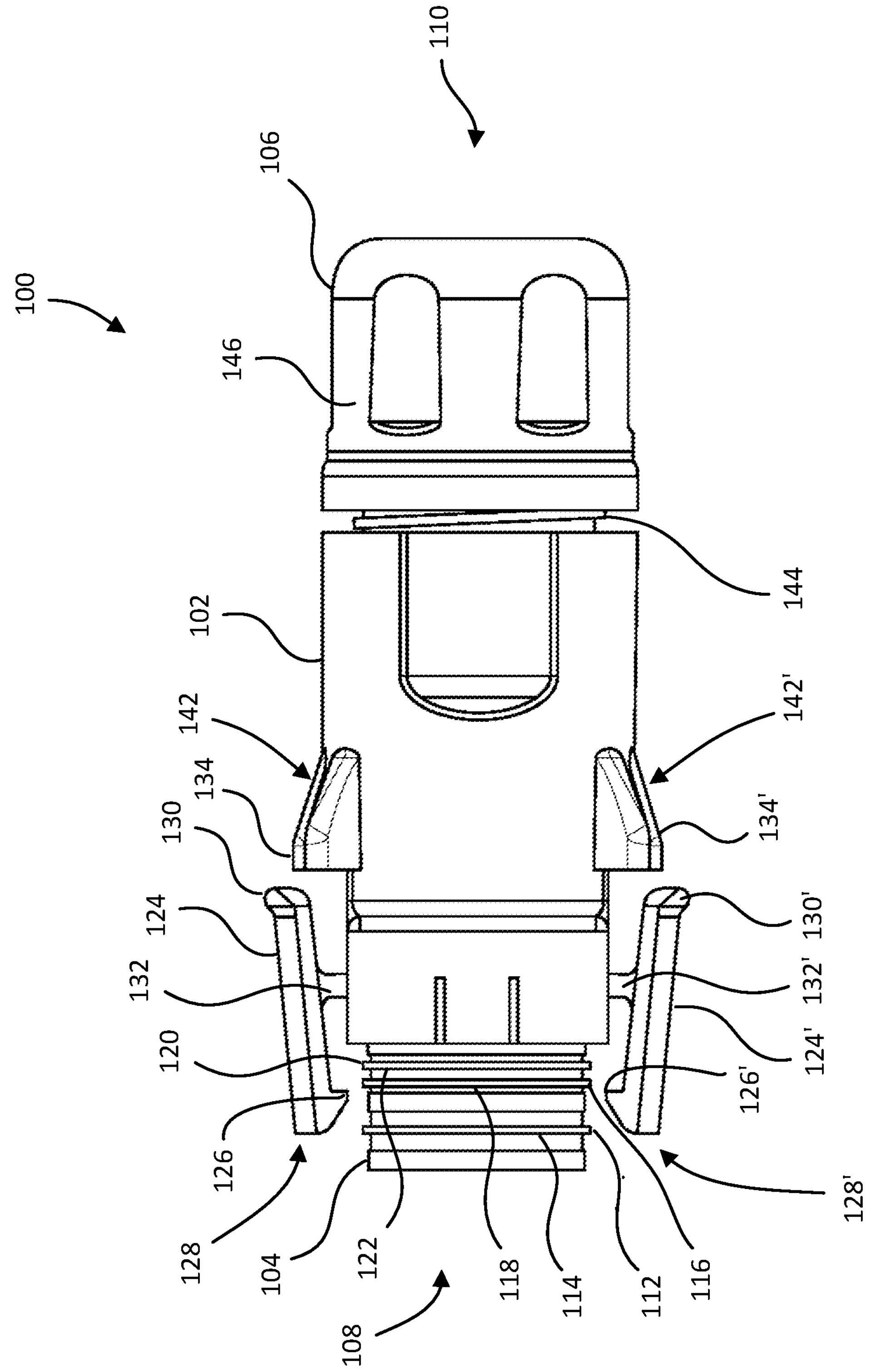
FIG. 1 is a side view of a first connector according to a configuration of the invention.

Referring now to the drawings, wherein like reference numerals designate corresponding structure throughout the views.

Figure 2:
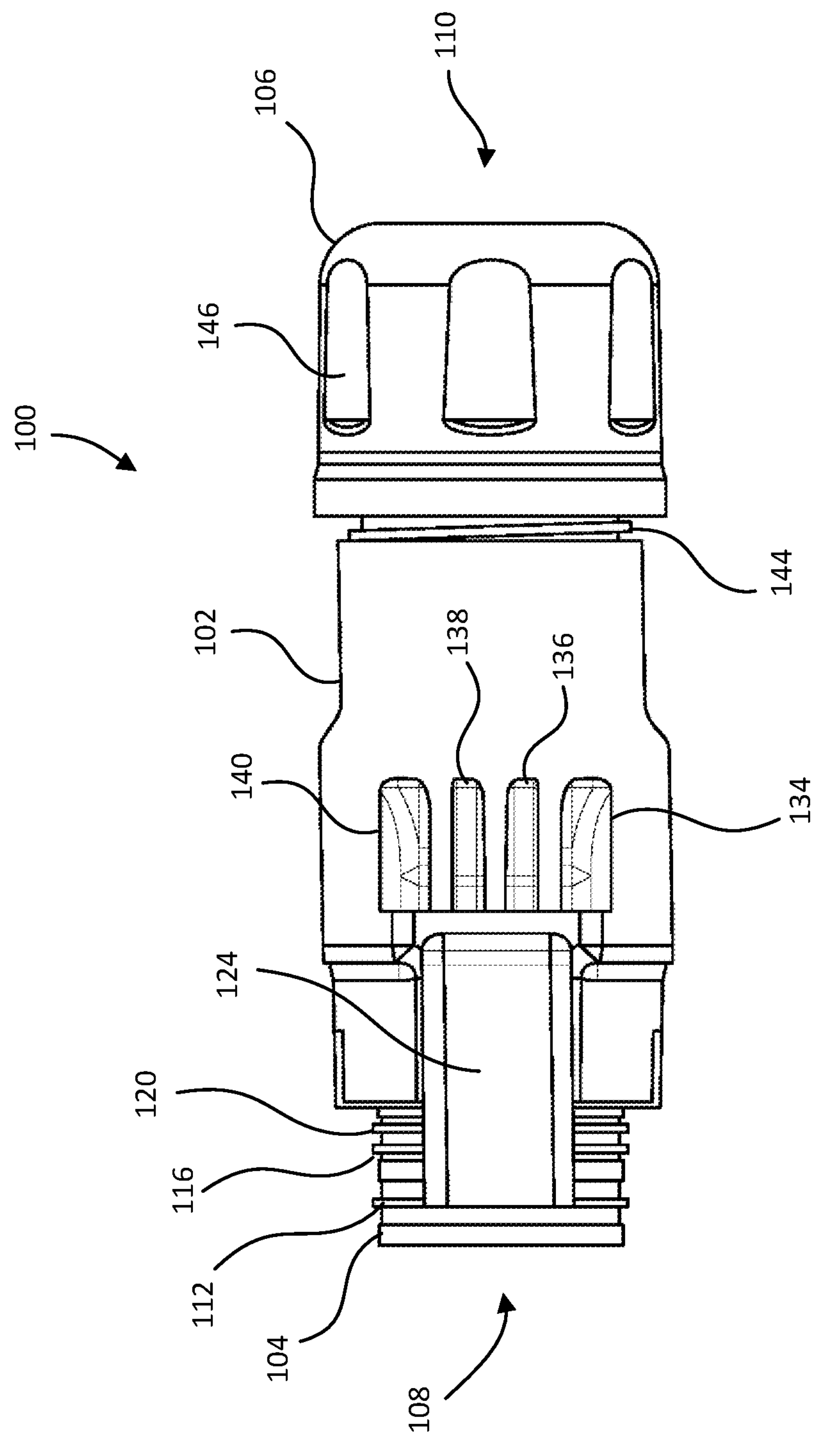
FIG. 2 is a top view the first connector according to FIG. 1.
Figure 3:
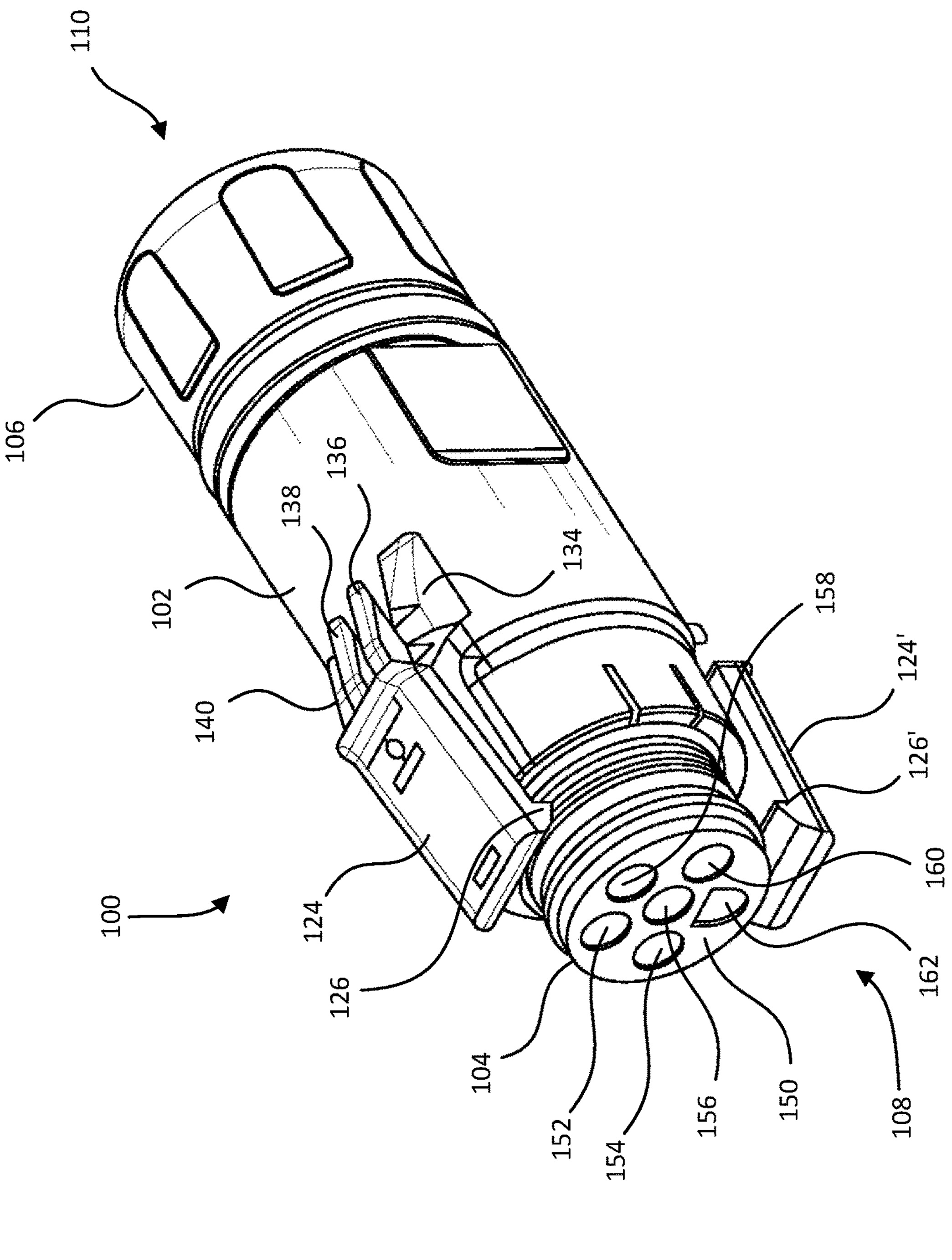
FIG. 3 is a perspective view of the first connector according to FIG. 1.

Referring to FIGS. 1-3, FIG. 1 is an illustration of a side view of a first connector 100 comprising a body portion 102, an insertion section 104 formed at a distal end 108 of the first connector 100, and a compression connector 106 formed at a proximal end 110 of the first connector 100. FIG. 2 is a top view of the first connector 100, and FIG. 3 is a perspective view of the first connector 100.

The body portion 102 is generally cylindrical in shape as can be seen with reference to FIGS. 1-3 and may comprise in one configuration a rigid plastic material. Insertion section 104 is provided with an outer diameter that is smaller than the outer diameter of the body portion 102. The insertion section 104 is provided with a first O-ring 112 that is positioned in a channel 114 extending circumferentially around the exterior surface of the insertion section 104. Also illustrated are a second O-ring 116 sitting in a second channel 118, and a third O-ring 120 sitting in a third channel 122.

An arm 124, 124' is positioned on the outer surface of the body portion 102. Arm 124, 124' is provided with a protrusion 126, 126' at a distal end 128, 128' of the arm 124, 124' and an area adapted to receive a force at a proximal end 130, 130' of the arm 124, 124'. Arm 124, 124' is provided such that if a force is applied to the raised section 128, 128' the arm 124, 124' will pivot about connection point 132, 132' causing the distal end to move outward relative to the insertion section 104.

Also shown is a raised portion 134, 134' that is formed adjacent to the proximal end 130, 130' of said arm 124, 124'. In one configuration, the raised portion 134, 134' is formed with an inclined surface 142, 142'. As can be better seen in FIGS. 2 and 3, the raised portion 134 may be formed as multiple raised sections 134, 136, 138, 140 where each of them are formed with an inclination relative to the outer surface of the body portion 102. While only a top view is provided, the raised portion 134' may also be provided in the same configuration as raised portion 134 including comprising multiple portions. The raised portions 134, 136, 138, 140 are provided so that the only way to apply a sufficient force to the arm 124 to cause the distal end to displace a significant amount is depress the proximal end 130 below the upper surface of the raised portions 134, 136, 138, 140. This is designed to prevent unintended depression of the arm 124.

As can be seen in FIG. 1, arms 124, 124' are positioned opposite each other. It will be understood by those of skill in the art that a single raised portion could be used, or four raised portions as shown in the drawings, or any other number depending on the application.

The proximal end 110 of the first connector comprises compression connector 106, which is formed as a threaded end 144 and a compression portion 146. Compression connector 106 is designed to receive a cable (not shown), which is threaded through proximal end 110 and when the compression portion 146 is screwed down on the threaded end 144, the compression connector secures the cable such that it cannot be pulled out of the compression connector 106.

As can be seen with reference to FIG. 3, the insertion section 104 comprises and end face 150 that includes a plurality of cavities 152, 154, 156, 158, 160, 162. The plurality of cavities is provided with a generally circular cross-section, however, cavity 162 is provided as a tombstone shape, which functions as a key to ensure that the first connector 100 can only be connected to a second connector 200 (FIGS. 4-6) in one configuration.

Figure 4:
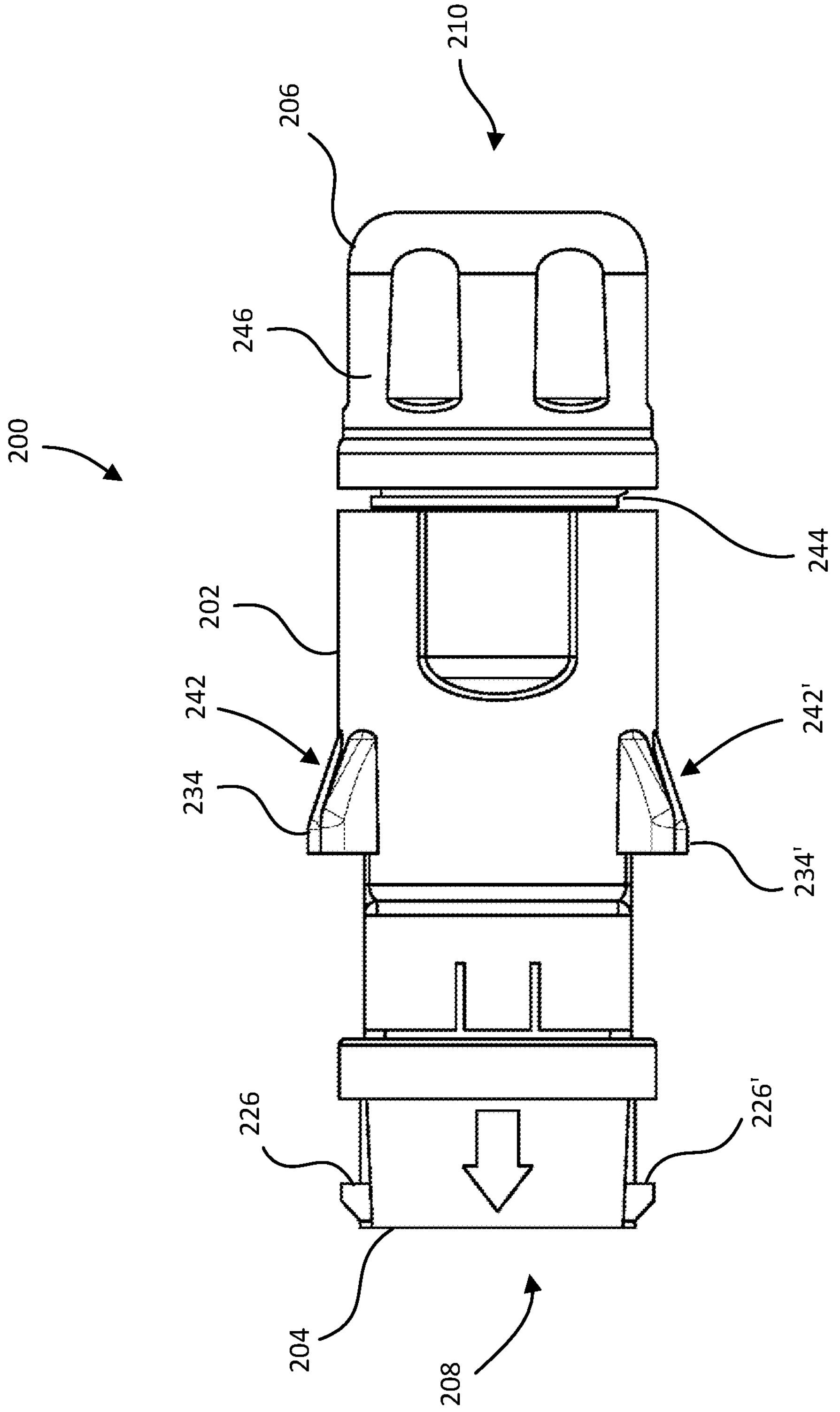
FIG. 4 is a side view of a second connector according to a configuration of the invention.
Figure 5:
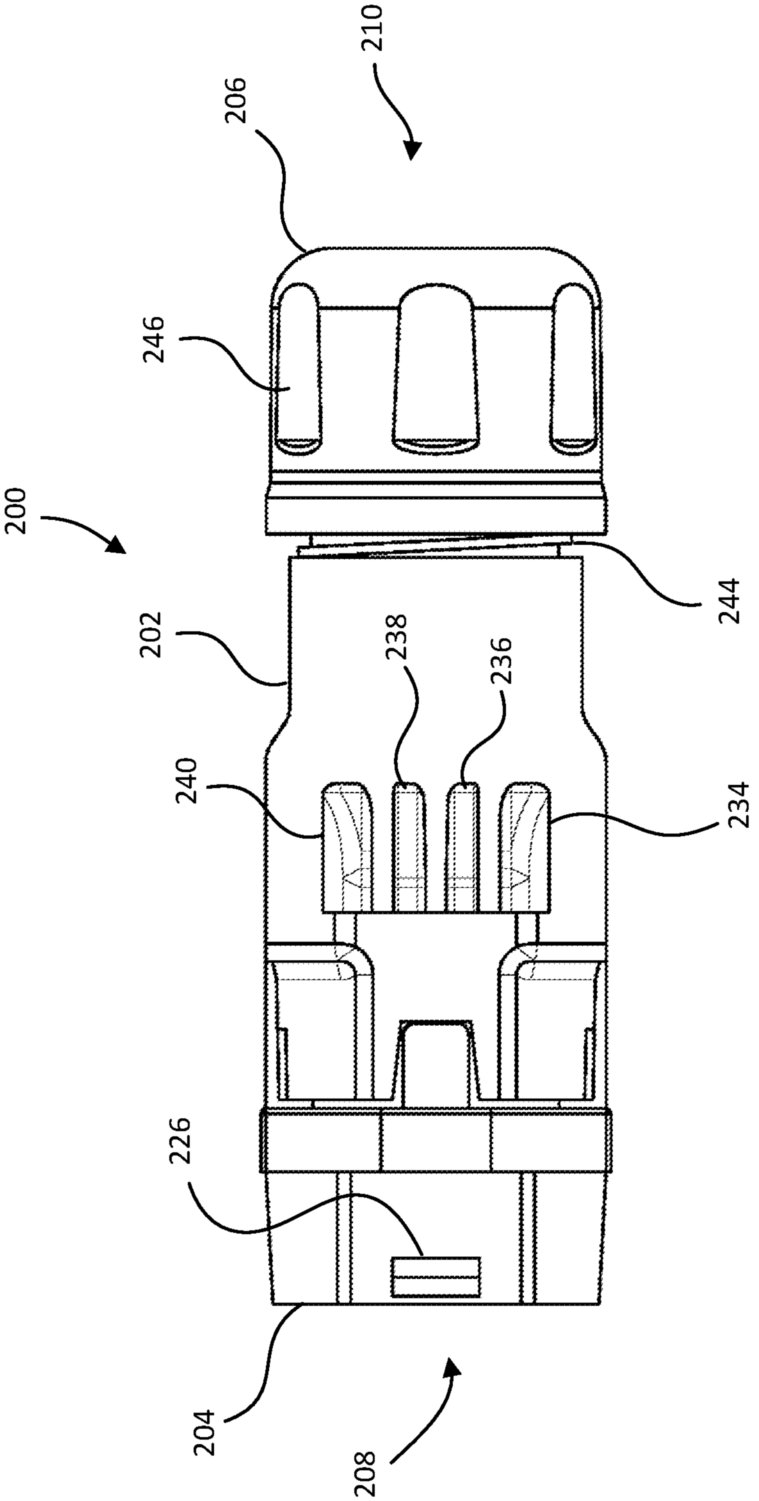
FIG. 5 is a top view the second connector according to FIG. 4.
Figure 6:
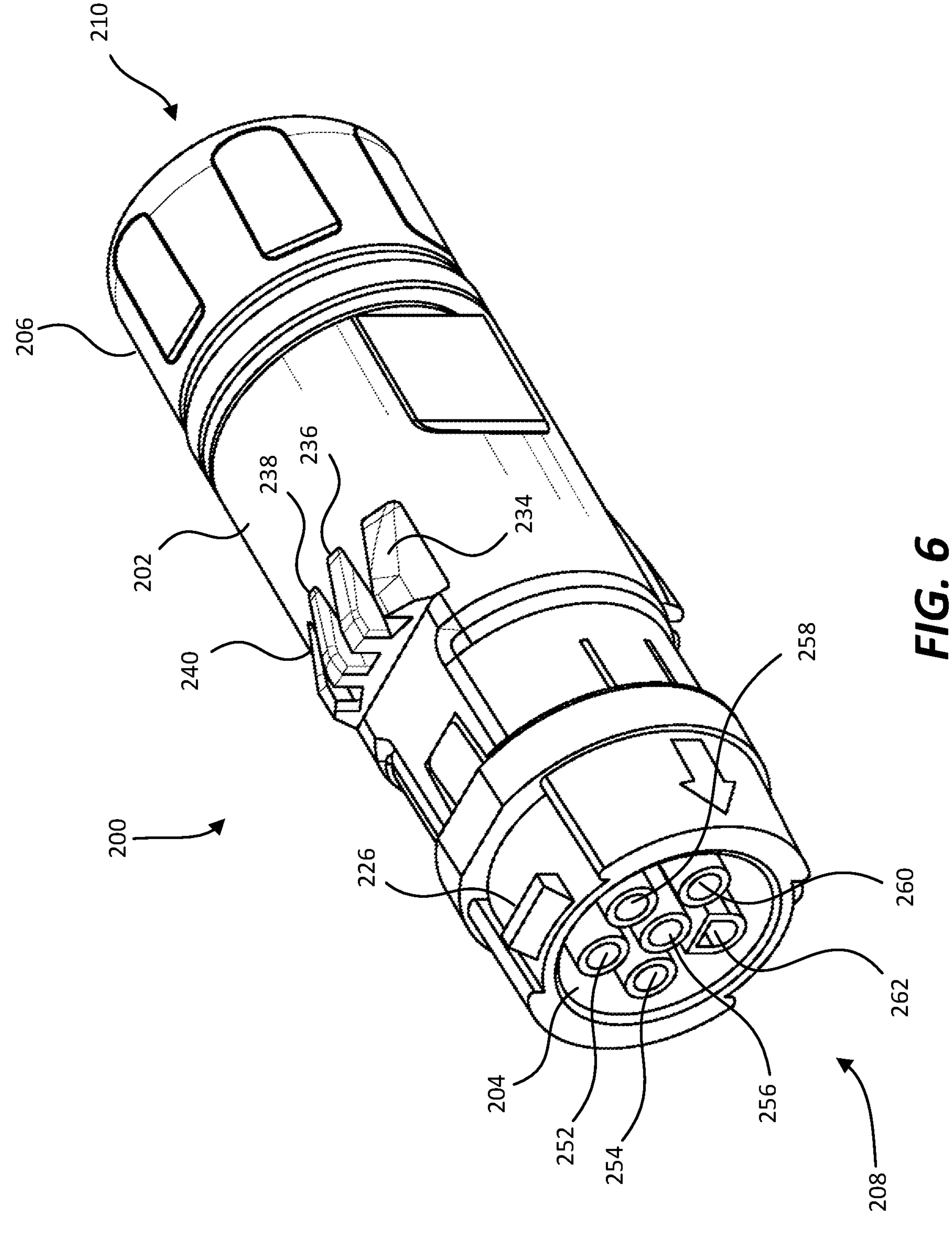
FIG. 6 is a perspective view of the second connector according to FIG. 4.

Referring to FIGS. 4-6, FIG. 4 is an illustration of a side view of a second connector 200 comprising a body portion 202, a cavity 204 formed at a distal end 208 of the second connector 200, and a compression connector 206 formed at a proximal end 210 of the second connector 200. FIG. 5 is a top view of the second connector 200, and FIG. 6 is a perspective view of the second connector 200.

As can be seen with reference to FIG. 6, cavity 204 of second connector 200 is designed to receive insertion section 104 of first connector 200. The inner surface of cavity 204 is designed to engage with first O-ring 112, second O-ring 116, and a third O-ring 120 to form a seal preventing water ingress into the interior of the first and second connectors 100, 200 respectively. A plurality of protrusions 252, 254, 256, 258, 260, 262 are positioned within cavity 204 and are configured to align with and correspond to the plurality of cavities 152, 154, 156, 158, 160, 162 on the insertion section 104. As can be seen in FIG. 6, protrusions 252, 254, 256, 258, 260 are provided with a generally circular cross-section (although any type of cross-section can be used), while protrusion 262 is tombstone-shaped such that the first and second connectors 100, 200 are keyed so that they can only be connected in one configuration.

Figure 7:
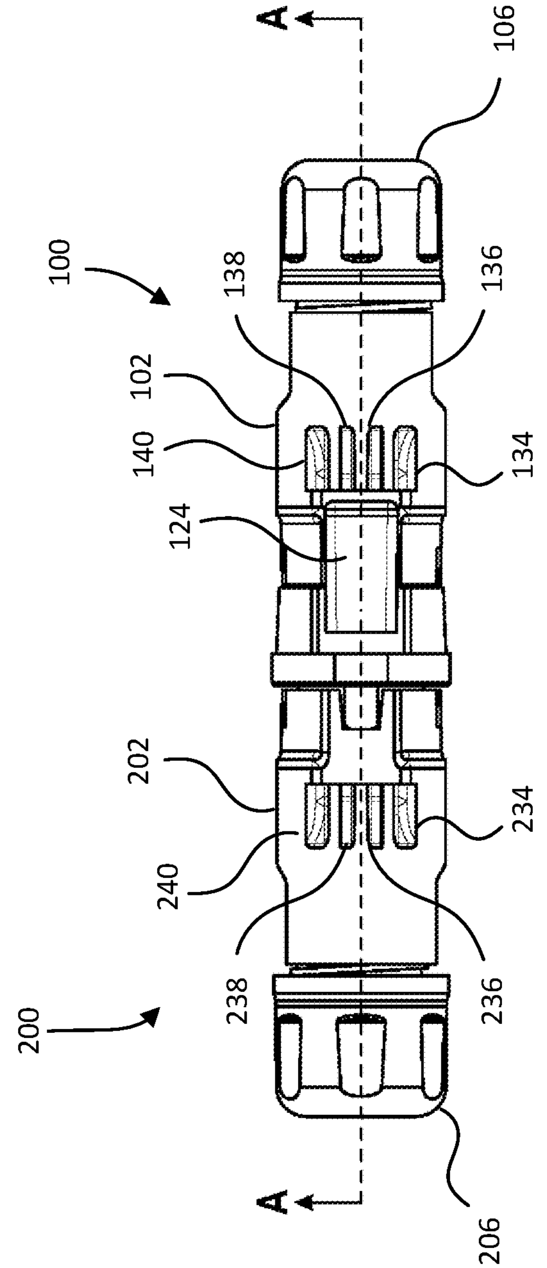
FIG. 7 is a top view of the first connector of FIG. 1 and second connector of FIG. 4 in a locked position relative to each other.
Figure 8:
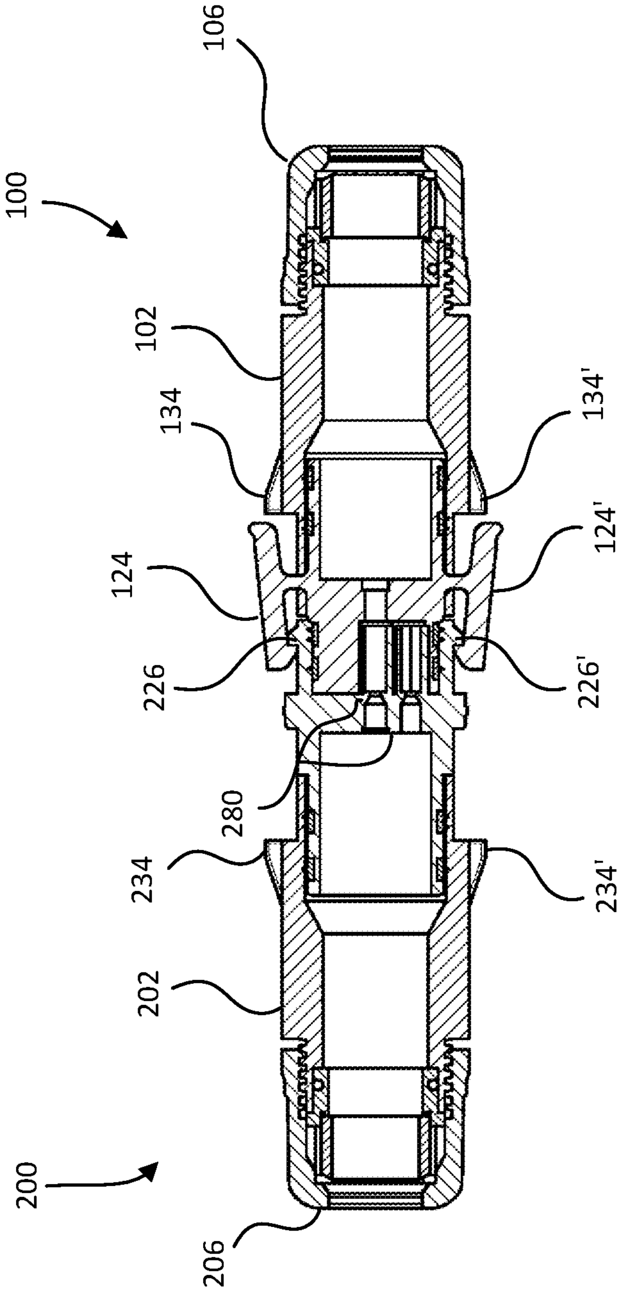
FIG. 8 is a cross-sectional view of the first and second connectors along line A-A according to FIG. 8.
Figure 9:
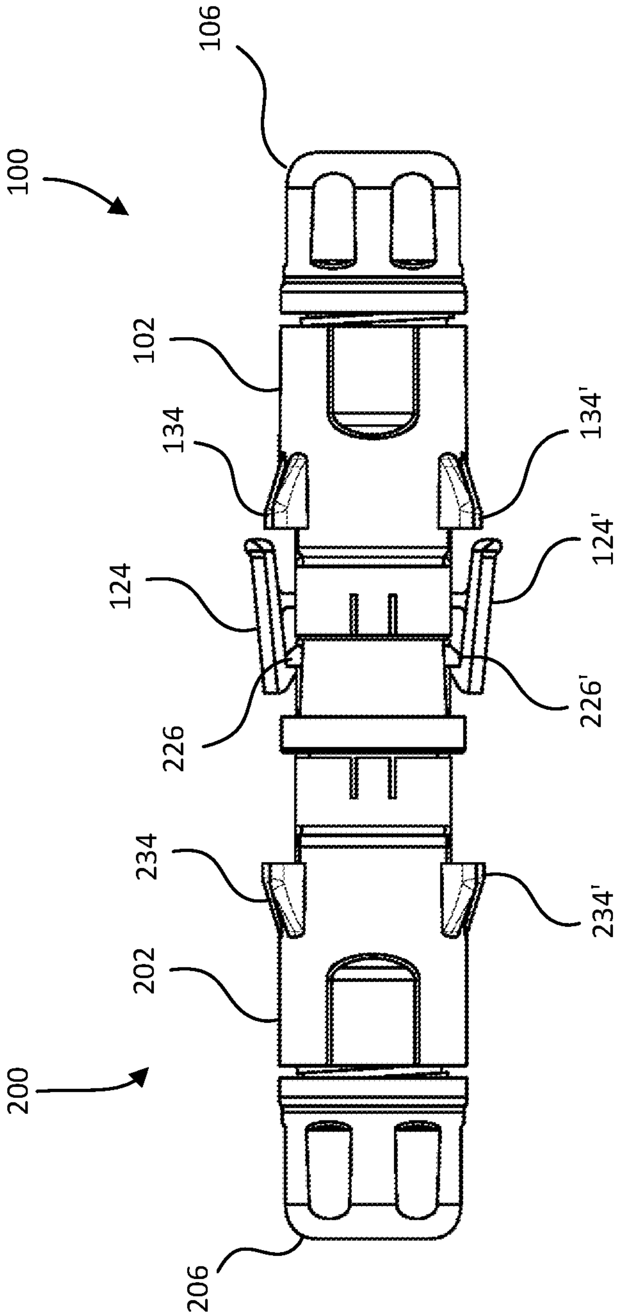
FIG. 9 is a side view of the first connector of FIG. 1 and second connector of FIG. 4 in a locked position relative to each other.
Figure 10:
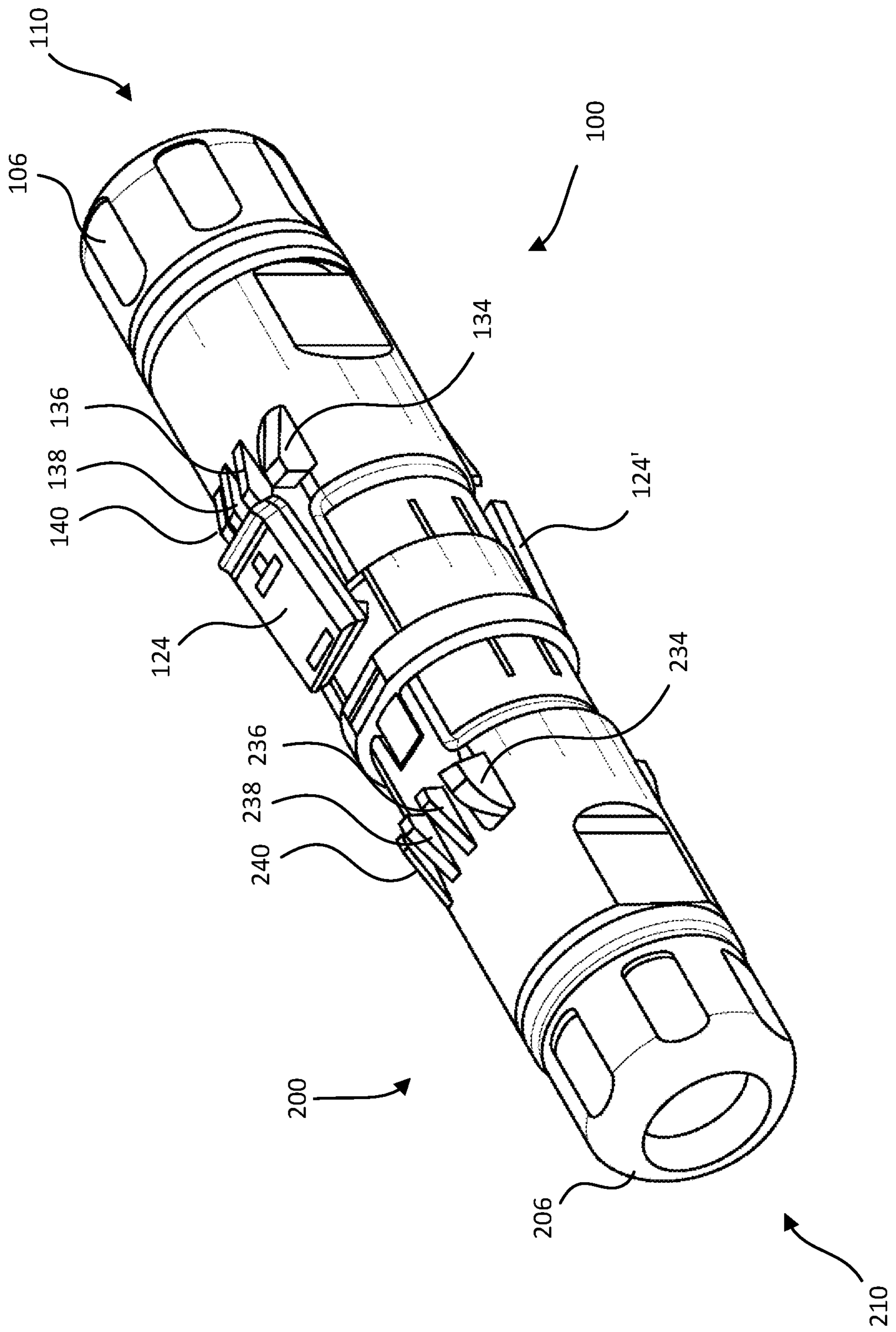
FIG. 10 is a perspective view of the first connector of FIG. 1 and second connector of FIG. 4 in a locked position relative to each other.

Also shown in FIG. 4 is undercut 226, 226' that is formed as a step for engaging with protrusion 126, 126'. The second connector 200 is designed such that when the insertion section 104 of first connector 100 is advanced into cavity 204 of second connector 200, the protrusion 126, 126' engages with an outer surface of the second connector 200 such that the distal end of the arm 124, 124' is deflected outward until it advances past undercut 226, 226' at which point the protrusion 126, 126' deflects inward and engages with the undercut 226, 226'. In this manner, the first and second connectors 100, 200 are securely held together which can be seen in FIGS. 7-10. For example, FIG. 7 is a top view of first and second connectors 100, 200 in an engaged position, where FIG. 8 is a sectional drawing of first and second connectors 100, 200 along section line A-A of FIG. 7. FIG. 9 is a side view of first and second connectors 100, 200 in an engaged position and FIG. 10 is a perspective view of first and second connectors 100, 200 in an engaged position.

The engagement of the protrusion 126, 126' with undercut 226, 226' can be better seen with reference to FIG. 9. As seen, arm 124, 124' is provided at an angle relative to the outer surfaces of the first and second connectors 100, 200 such that the protrusion 226, 226' and the undercut 126, 126' form a highly secure locking mechanism.

Additionally, since there are two arms positioned opposite each other, this prevents any accidental disconnection of the connectors as a force must be applied to both sides simultaneously and the proximal ends of the arms must be depressed below a top surface of the raised portions.

Referring to FIG. 6, protrusions 252, 254, 256, 258, 260, 262 are provided with open ends as can be seen with reference to FIG. 6. Each of protrusions 252, 254, 256, 258, 260, 262 are provided with pins positioned within the open ends and can be seen with reference to FIG. 8 showing a cutaway view of the first and second connectors 100, 200 and FIG. 11. The pins are designed to seat into electrically conductive receptacles that are provided in the corresponding plurality of cavities 152, 154, 156, 158, 160, 162 in insertion section 104 (FIG. 12). In the configuration shown in FIGS. 3 and 6, there will be a total of six pins and six corresponding receptacles. However, it will be understood by those of skill in the art that any number of combination of pins/receptacles can be used depending on the application.

In one configuration, the pins may be connected to or seated in a flexible material 280 provided on the second connector 200 at a base portion of each pin. The flexible material 280 may allow for some lateral movement of the distal end of the pin without breaking the pins. In one configuration, the flexible material 280 could comprise a molded silicone that provides a seal at the base of each respective pin. In another configuration, the protrusions 252, 254, 256, 258, 260, 262 may extend to flexible material 280 when the first and second connectors 100, 200 are fully seated with respect to each other and the locking mechanism is engaged, thereby forming a seal between the protrusions 252, 254, 256, 258, 260, 262 and the flexible material 280.

Figure 11:
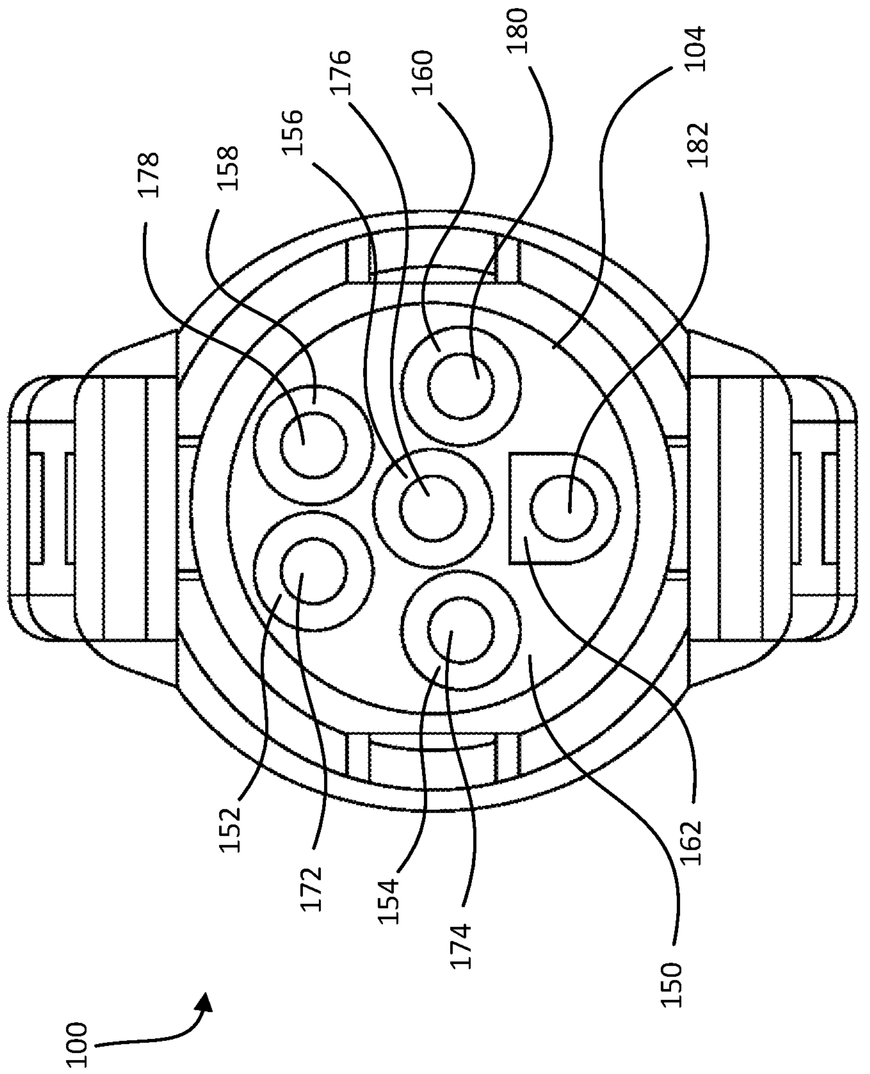
FIG. 11 is an end view of the first end of the first connector according to FIG. 1.
Figure 12:
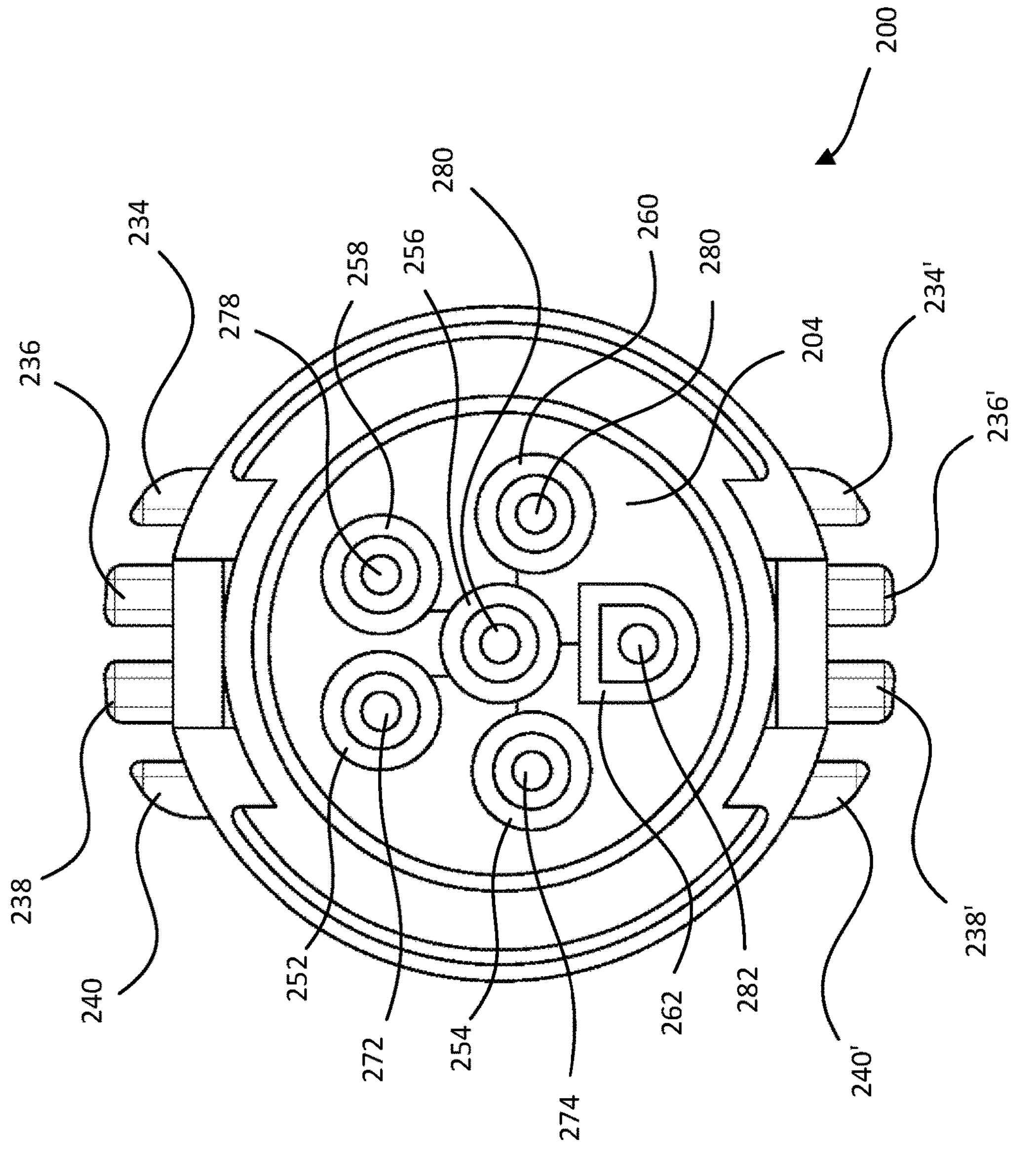
FIG. 12 is an end view of the first end of the second connector according to FIG. 4.

Referring now to FIGS. 11 and 12, an end view of first connector 100 is shown in FIG. 11 and an end view of second connector 200 is shown in FIG. 12.

FIG. 11 shows the end face 150 of first connector 100 with the plurality of cavities 152, 154, 156, 158, 160, 162 in insertion section 104. The plurality of cavities 152, 154, 156, 158, 160, 162 are provided with electrically conductive receptacles 172, 174, 176, 178, 180, 182 respectively.

FIG. 12 shows cavity 204 of second connector 200 with the plurality of protrusions 252, 254, 256, 258, 260, 262 positioned within cavity 204. The plurality of protrusions 252, 254, 256, 258, 260, 262 have openings in the ends of each protrusion where pins 272, 274, 276, 278, 280, 282 are positioned to interact respectively with the electrically conductive receptacles 172, 174, 176, 178, 180, 182 when the first and second connectors 100, 200 are engaged and fully seated with each other.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A weatherproof electrical connector comprising:

a first connector having first and second ends, the first end formed as an insertion section, the insertion section having:

an end face having a plurality of cavities;

a plurality of electrically conductive receptacles positioned within said plurality of cavities;

a second connector having first and second ends, the first end formed as a cavity for receiving said insertion section, the cavity having a plurality of protrusions positioned therein and corresponding to said plurality of cavities in said end face of said insertion section, wherein each of said plurality of protrusions is provided with an end face with an opening provided therein, and a pin for engaging with a corresponding electrically conductive receptacle in the plurality of cavities in the end face of said first connector;

said first connector having a locking member formed as an arm and having a protrusion at a distal end of said arm;

said second connector having an undercut positioned thereon that is adapted to interact with the protrusion such that when the first and second connectors are fully seated with each other, the protrusion interacts with said undercut to prevent said first and second connectors from being pulled apart;

said arm including an area adapted to receive a force at a proximal end of said arm such the distal end of said arm is adapted to disengage with the undercut so that the first and second connectors can be disengaged with each other;

a raised section provided adjacent to the proximal end of said arm, said raised section formed as a rigid material and extending radially outward from and exterior surface of the first connector to prevent accidental disengagement of said arm from the undercut.

2. The weatherproof electrical connector of claim 1, wherein said arm is formed at an inclination relative to an outer surface of said first connector.

3. The weatherproof electrical connector of claim 1, said second connector further comprising a raised section provided on an outer surface of the second connector.

4. The weatherproof connector of claim 1, wherein said plurality of cavities comprises six cavities.

5. The weatherproof connector of claim 1, wherein at least one of said plurality of cavities is keyed to ensure said first connector can only be connected with said second connector in one alignment.

6. The weatherproof connector of claim 1, wherein said insertion section is tapered such that a circumference of the distal end of said insertion section is smaller than a circumference of the proximal end of said insertion section.

7. The weatherproof connector of claim 1, wherein the arm comprises a first arm and said protrusion comprises a first protrusion, and wherein said undercut comprises a first undercut, the weatherproof connector further comprising:

a second arm positioned on said first connector on an exterior surface thereof, said second arm positioned opposite said first arm, said second arm having a second protrusion at a distal end of said second arm;

a second undercut positioned on said second connector on an exterior surface thereof, said second undercut positioned opposite said first undercut;

wherein when the first and second connectors are fully seated with each other, the first protrusion interacts with said first undercut and the second protrusion interacts with said second undercut to prevent said first and second connectors from being pulled apart.

8. The weatherproof electrical connector of claim 1, wherein said raised section is formed as an inclined surface relative to an outer surface of the first connector.

9. The weatherproof electrical connector of claim 8, wherein said raised section comprises at least four separate raised sections adjacent to each other.

10. The weatherproof connector of claim 1, wherein said plurality of electrically conductive pins are seated in a flexible material allowing for lateral displacement without breakage of said pins.

11. The weatherproof connector of claim 10, wherein the flexible material comprises molded silicone and provides a seal at a bottom portion of the pins.

12. The weatherproof connector of claim 1, wherein said second end of said first connector comprises a compression connector for receiving and securely holding a cable to be coupled with said first connector.

13. The weatherproof connector of claim 12, wherein said second end of said second connector comprises a compression connector for receiving and securely holding a cable to be coupled with said second connector.

14. The weatherproof connector of claim 1, wherein said insertion section comprises an outer surface that includes at least one channel with an O-ring positioned therein, said O-ring adapted to interact with an inner surface of said cavity in said second connector to form a seal.

15. The weatherproof connector of claim 14, wherein said at least one channel comprises a plurality of channels, each of said plurality of channels having an O-ring positioned therein, said O-rings adapted to interact with the inner surface of said cavity in said second connector to form seals.

16. The weatherproof connector of claim 15, wherein said O-ring positioned in said channel closest to the distal end of said insertion section has a circumference smaller than the O-rings positioned in the other channels closer to a proximal end of the insertion section.

17. A weatherproof electrical connector comprising:

a first connector having a first end formed as an insertion section, the insertion section having an end face with a plurality of cavities formed therein;

a second connector having a first end formed as a cavity for receiving said insertion section, the cavity having a plurality of protrusions positioned therein corresponding to said plurality of cavities;

wherein each of said plurality of protrusions is provided with an end face with an opening provided therein;

a pin provided in each of the plurality of cavities or each of the openings, and an electrically conductive receptacle provided in each of the plurality of cavities or each of the openings, wherein the pin and receptacles are designed to interact with each other to form an electrical connection;

said first connector having a locking member formed as an arm and having a protrusion at a distal end of said arm;

said second connector having an undercut positioned thereon that is adapted to interact with the protrusion such that when the first and second connectors are fully seated with each other, the protrusion interacts with said undercut to prevent said first and second connectors from being pulled apart;

said arm including an area adapted to receive a force at a proximal end of said arm such the distal end of said arm is adapted to disengage with the undercut so that the first and second connectors can be disengaged with each other;

a raised section provided adjacent to the proximal end of said arm, said raised section formed as a rigid material and extending radially outward from and exterior surface of the first connector to prevent accidental disengagement of said arm from the undercut.

18. The weatherproof connector of claim 17, wherein said arm is formed at an inclination relative to an outer surface of said first connector.

19. The weatherproof connector of claim 17, wherein at least one of said plurality of cavities is keyed to ensure said first connector can only be connected with said second connector in one alignment.

20. The weatherproof connector of claim 17, wherein said second end of said first connector comprises a compression connector and said second end of said second connector comprises a compression connector.

21. The weatherproof connector of claim 17, wherein said insertion section is tapered such that a circumference of the distal end of said insertion section is smaller than a circumference of the proximal end of said insertion section.

22. The weatherproof connector of claim 17, wherein the arm comprises a first arm and said protrusion comprises a first protrusion, and wherein said undercut comprises a first undercut, the weatherproof connector further comprising:

a second arm positioned on said first connector on an exterior surface thereof, said second arm positioned opposite said first arm, said second arm having a second protrusion at a distal end of said second arm;

a second undercut positioned on said second connector on an exterior surface thereof, said second undercut positioned opposite said first undercut;

wherein when the first and second connectors are fully seated with each other, the first protrusion interacts with said first undercut and the second protrusion interacts with said second undercut to prevent said first and second connectors from being pulled apart.

23. The weatherproof connector of claim 17, wherein the pins are seated in a flexible material allowing for lateral displacement without breakage of the pins.

24. The weatherproof connector of claim 23, wherein the flexible material comprises molded silicone and provides a seal at a bottom portion of the pin.

25. The weatherproof connector of claim 17, wherein said insertion section comprises an outer surface that includes at least one channel with an O-ring positioned therein, said O-ring adapted to interact with an inner surface of said cavity in said second connector to form a seal.

26. The weatherproof connector of claim 25, wherein said at least one channel comprises a plurality of channels, each of said plurality of channels having an O-ring positioned therein, said O-rings adapted to interact with the inner surface of said cavity in said second connector to form seals.

27. The weatherproof connector of claim 26, wherein said O-ring positioned in said channel closest to the distal end of said insertion section has a circumference smaller than the O-rings positioned in the other channels closer to a proximal end of the insertion section.

* * * * *